United States Patent
Sagong et al.

(10) Patent No.: US 10,306,655 B2
(45) Date of Patent: May 28, 2019

(54) METHOD AND APPARATUS FOR MEASURING CHANNEL IN WIRELESS COMMUNICATION SYSTEM

(71) Applicant: Samsung Electronics Co., Ltd, Gyeonggi-do (KR)

(72) Inventors: Min Sagong, Gyeonggi-do (KR); Yong-Ho Cho, Gyeonggi-do (KR); Ji-Yun Seol, Gyeonggi-do (KR); Yeo-Hun Yun, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 80 days.

(21) Appl. No.: 15/418,616

(22) Filed: Jan. 27, 2017

(65) Prior Publication Data

US 2017/0215197 A1 Jul. 27, 2017

(30) Foreign Application Priority Data

Jan. 27, 2016 (KR) .......................... 10-2016-0010323

(51) Int. Cl.
*H04W 72/04* (2009.01)
*H04W 72/08* (2009.01)
*H04W 74/08* (2009.01)

(52) U.S. Cl.
CPC ..... *H04W 72/085* (2013.01); *H04W 72/0413* (2013.01); *H04W 72/0453* (2013.01); *H04W 72/08* (2013.01); *H04W 74/0833* (2013.01)

(58) Field of Classification Search
CPC .......... H04W 72/085; H04W 72/0413; H04W 72/08; H04W 72/0453; H04W 74/0833
See application file for complete search history.

(56) References Cited

U.S. PATENT DOCUMENTS

| | | | |
|---|---|---|---|
| 10,085,234 B2* | 9/2018 | Basu Mallick | H04W 68/02 |
| 2015/0305040 A1* | 10/2015 | Xia | H04J 3/1694 370/337 |
| 2016/0249358 A1* | 8/2016 | Li | H04W 72/0453 |
| 2016/0295345 A1* | 10/2016 | Oh | H04W 4/70 |
| 2016/0295609 A1* | 10/2016 | Vajapeyam | H04L 5/14 |
| 2017/0180001 A1* | 6/2017 | Wang | H04B 1/7143 |
| 2017/0208591 A1* | 7/2017 | Rico Alvarino | H04W 4/70 |
| 2017/0230977 A1* | 8/2017 | Shen | H04W 4/70 |
| 2017/0238284 A1* | 8/2017 | Tseng | H04L 5/0091 370/329 |
| 2017/0303154 A1* | 10/2017 | Merlin | H04W 24/10 |

(Continued)

*Primary Examiner* — Brian T O Connor (57) ABSTRACT

A method for determining an uplink (UL) channel quality by a base station (BS) includes obtaining a coverage class (CC) value of a user equipment (UE), receiving a random access (RA) signal from the UE, determining an UL channel quality of a band in which the RA signal is transmitted, based on the CC value and the RA signal, and generating UL resource allocation information based on the UL channel quality and transmitting the UL resource allocation information to the UE. The BS includes a transceiver configured to obtain a CC value of a UE and to receive a RA signal from the UE, and a controller configured to determine an UL channel quality of a band in which the RA signal is transmitted, based on the CC value and the RA signal. A UE includes determines a CC value of the UE based on a DL signal.

36 Claims, 8 Drawing Sheets

(56) References Cited

U.S. PATENT DOCUMENTS

| | | | | |
|---|---|---|---|---|
| 2017/0311284 | A1* | 10/2017 | Basu Mallick | H04W 68/02 |
| 2017/0318410 | A1* | 11/2017 | Oh | H04W 4/70 |
| 2017/0339712 | A1* | 11/2017 | Rico Alvarino | H04W 72/048 |
| 2018/0049053 | A1* | 2/2018 | Kaikkonen | H04W 24/08 |
| 2018/0069589 | A1* | 3/2018 | Liu | H04B 1/005 |
| 2018/0097541 | A1* | 4/2018 | Bhattad | H04L 5/0091 |
| 2018/0097599 | A1* | 4/2018 | Lee | H04W 24/02 |
| 2018/0102887 | A1* | 4/2018 | Chen | H04W 4/70 |
| 2018/0123653 | A1* | 5/2018 | Wang | H04B 7/0417 |
| 2018/0139725 | A1* | 5/2018 | Takeda | H04W 72/042 |
| 2018/0242321 | A1* | 8/2018 | Takeda | H04W 4/04 |
| 2018/0249508 | A1* | 8/2018 | Gao | H04L 5/0053 |
| 2018/0270867 | A1* | 9/2018 | Yi | H04W 74/0833 |
| 2018/0359725 | A1* | 12/2018 | Basu Mallick | H04W 68/02 |

* cited by examiner

|  | A | B | C | D | E | F |
|---|---|---|---|---|---|---|
| ORDER |  |  | ① | ② | ③ | ④ |
| (UE) Band Scan Complete flag |  |  | 0 | 0 | 0 | 0 |
| RACH success |  |  | O | O | X | O |
| Channel Quality |  |  | bad | bad |  | good |
| (eNB) RACH Band Move flag |  |  | 1 | 1 |  | 0 |
| (eNB) UL Transmission flag |  |  | 0 | 0 |  | 1 |
| C-RNTI |  |  | Give C-RNTI | RACH w/ C-RNTI |  | Terminate C-RNTI |

FIG.5

|  | A | B | C | D | E | F |
|---|---|---|---|---|---|---|
| ORDER |  |  | ① | ② | ③ | ④ |
| (UE) Band Scan Complete flag |  |  | 0 | 0 | 0 | 0 |
| RACH success |  |  | O | O | X | O |
| Channel Quality |  |  | bad | bad |  | good |
| (eNB) RACH Band Move flag |  |  | 1 | 1 |  | 0 |
| (eNB) UL Transmission flag |  |  | 1 | 1 |  | 1 |
| UE ID |  |  | Obtained | Obtained |  | Obtained |

FIG.6

|  | A | B | C | D | E | F |
|---|---|---|---|---|---|---|
| ORDER | ⑤ | ⑥ | ① | ② | ③ | ④ |
| (UE) Band Scan Complete flag | 0 | 1 | 0 | 0 | 0 | 0 |
| RACH success | X | O | O | O | X | O |
| Channel Quality |  | bad | bad | bad |  | good |
| (eNB) RACH Band Move flag |  | 0 | 1 | 1 |  | 1 |
| (eNB) UL Transmission flag |  | 0 | 0 | 0 |  | 0 |
| C-RNTI |  | Terminated | Obtained |  |  |  |
| UE ID |  |  | Obtained |  |  |  |

METHOD AND APPARATUS FOR MEASURING CHANNEL IN WIRELESS COMMUNICATION SYSTEM

CROSS-REFERENCE TO RELATED APPLICATION AND CLAIM OF PRIORITY

The present application is related to and claims the benefit under 35 U.S.C. § 119(a) of a Korean patent application filed in the Korean Intellectual Property Office on Jan. 27, 2016 and assigned Serial No. 10-2016-0010323, the entire disclosure of which is incorporated herein by reference.

TECHNICAL FIELD

The present disclosure relates to a method and apparatus for measuring a channel in a wireless communication system. More particularly, the present disclosure relates to a method and apparatus for selecting an uplink (UL) channel between a user equipment (UE) (or a terminal) and an evolved NodeB (eNB) (or a base station) in a cellular Internet of things (IoT) system.

BACKGROUND

To satisfy demands for wireless data traffic having increased since commercialization of $4^{th}$-Generation (4G) communication systems, efforts have been made to develop improved $5^{th}$-Generation (5G) communication systems or pre-5G communication systems. For this reason, the 5G communication system or the pre-5G communication system is also called a beyond-4G-network communication system or a post-long term evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Meanwhile, research on the Internet of things (IoT) technology has been actively carried out. Although the IoT technology is at its early stage, numerous IoT related services are introduced very fast. In line with this, the 3rd Generation Partnership Project (3GPP) has discussed the cellular communication system-based Internet of things (CIoT). Hereinbelow, a Long Term Evolution (LTE) system will be described as a representative cellular communication system.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for measuring a channel between a UE and an eNB in a wireless communication system.

The present disclosure provides a method and apparatus for measuring an UL channel between a UE and an eNB while minimizing power consumption of the UE in a wireless communication system.

The present disclosure provides a method and apparatus for selecting an optimal band among a plurality of bands in a CIoT communication system using the plurality of bands.

The present disclosure provides a method and apparatus for measuring a channel quality of a band by using a random access procedure in a CIoT communication system using a plurality of bands.

According to an embodiment of the present disclosure, there is provided a method for determining an UL channel quality by an eNB in a wireless communication system, the method including obtaining a coverage class (CC) value of a UE, receiving a random access (RA) signal from the UE, determining an UL channel quality of a band in which the RA signal is transmitted, based on the CC value and the RA signal, and generating UL resource allocation information based on the determined UL channel quality and transmitting the generated UL resource allocation information to the UE.

According to another embodiment of the present disclosure, there is provided a method for performing a random access by a UE in a wireless communication system, the method including determining a CC value of the UE based on a downlink (DL) signal, transmitting an RA signal including the CC value to an eNB, and receiving UL resource allocation information from the eNB, in which the UL resource allocation information is generated based on a channel quality of a band in which the RA signal is transmitted, determined by the eNB based on the CC value and the RA signal.

According to another embodiment of the present disclosure, there is provided an eNB for determining a channel quality in a wireless communication system, the eNB including a transceiver configured to obtain a CC value of a UE and to receive an RA signal from the UE and a controller configured to determine an UL channel quality of a band in which the RA signal is transmitted, based on the CC value and the RA signal, to generate UL resource allocation information based on the determined UL channel quality, and to transmit the generated UL resource allocation information to the UE through the transceiver.

According to another embodiment of the present disclosure, there is provided a UE for performing random access in a wireless communication system, the UE including a controller configured to determine a CC value of the UE based on a DL signal and a transceiver configured to transmit an RA signal including the CC value from an eNB and to receive UL resource allocation information from the eNB, in which the UL resource allocation information is generated based on a channel quality of a band in which the RA signal is transmitted, determined by the eNB based on the CC value and the RA signal.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

In the following description of the present disclosure, a detailed description of well-known functions or elements associated with the present disclosure will be omitted if it unnecessarily obscures the subject matter of the present disclosure. Hereinafter, embodiments will be described with reference to the accompanying drawings.

The following embodiments will be separately described for convenience, but at least two embodiments may be implemented in combination without colliding with each other.

Further, the terminologies to be described below are defined in consideration of functions in the embodiments of the present disclosure and may vary depending on a user's or operator's intention or practice. Therefore, the definitions should be made based on the contents throughout the entire description of the present disclosure.

Various changes may be made to embodiments of the present disclosure and the present disclosure may have various embodiments which will be described in detail with reference to the drawings. However, the embodiments according to the concept of the present disclosure are not construed as limited to specified disclosures, and include all changes, equivalents, or substitutes that do not depart from the spirit and technical scope of the present disclosure.

Although the terms such as "first" and "second" used in the various exemplary embodiments of the present disclosure may modify various elements of the various exemplary embodiments, these terms do not limit the corresponding elements. These terms may be used for the purpose of distinguishing one element from another element. For example, a first element may be named as a second element without departing from the right scope of the various exemplary embodiments of the present disclosure, and similarly, a second element may be named as a first element. The term "and/or" includes a combination of a plurality of related provided items or any one of the plurality of related provided items.

The terms used in the various exemplary embodiments of the present disclosure are for the purpose of describing particular exemplary embodiments only and are not intended to be limiting. The singular forms are intended to include the plural forms as well, unless the context clearly indicates otherwise. The term "include" or "has" used in the exemplary embodiments of the present disclosure is to indicate the presence of features, numbers, steps, operations, elements, parts, or a combination thereof described in the specifications, and does not preclude the presence or addition of one or more other features, numbers, steps, operations, elements, parts, or a combination thereof.

The apparatus and method proposed in the present disclosure are applicable to various communication systems such as a Long-Term Evolution (LTE) mobile communication system, an LTE-Advanced (LTE-A) mobile communication system, a high speed downlink packet access (HSDPA) mobile communication system, a high speed uplink packet access (HSUPA) mobile communication system, a high rate packet data (HRPD) mobile communication system of the 3GPP2, a wideband code division multiple access (WCDMA) mobile communication system of the 3GPP2, a code division multiple access (CDMA) mobile communication system of the 3GPP2, the Institute of Electrical and Electronics Engineers (IEEE) 802.16m communication system, an evolved packet system (EPS), a mobile Internet Protocol (IP) system, and so forth.

The main concept of the present disclosure will be described in brief.

In a cellular communication system-based Internet of things (CIoT) system, an evolved NodeB (eNB) (or a base station) measures the quality of an UL channel by using coverage class information and a random access (RA) signal that is sent by a user equipment (UE) (or a terminal) to the eNB, determines a weight value using a difference between a channel quality measured based on the coverage class and a channel quality measured based on the RA signal and a predetermined threshold value, and determines an UL channel quality value using a weighted sum of the channel quality measured based on the coverage class and the channel quality measured based on the RA signal. Thereafter, by using the determined channel quality value, whether to allocate a random access (RA) channel to the UE and/or a modulation and coding scheme (MCS) level for UL data transmission of the UE is determined. In this case, the threshold value can be determined based on an MCS table, a retransmission probability, an MCS-specific repetition number, an UL signal to noise ratio (SINR), etc. The threshold value can be a fixed value or a variable value that changes with various values including the above-described parameters.

In the present disclosure, a reason for determining an UL channel quality based on a coverage class (CC) or an RA signal is as described below.

A CC has been introduced in a CIoT system to indicate a class of a UE according to a distance between an eNB and the UE. The UE receives a DL signal from the eNB and determines its CC value based on a received signal strength of the DL signal. The CC value determined by the UE can be transmitted to the eNB through an RA signal for attempting a random access to the eNB. However, the CC value is not necessarily included in the RA signal and can be notified to the eNB in any manner. When the CC value is transmitted through the RA signal, the CC value can be implicitly included, instead of being included as separate information bits. For example, if a sequence corresponding to a predetermined CC value is used as a sequence used in the RA signal, the eNB having received the predetermined sequence can recognize the CC value corresponding to the received sequence. If the RA signal is transmitted on a time/frequency resource corresponding to the CC value, the eNB having received the RA signal can recognize the CC value corresponding to the time/frequency resource of the received RA signal.

The eNB measures an UL channel quality between the UE and the eNB based on the CC value, and determines an MCS for data transmission of the UE. Assuming a case where the UL and the DL operate according to frequency division duplexing (FDD), a frequency band of the DL and a frequency band of the UL are generally spaced apart from each other by several MHz or more, such that the DL channel and the UL channel can have different characteristics. Meanwhile, the CC value is determined based on a DL signal received by the UE, and if the eNB measures the quality of the UL channel based on the CC value, the measured quality of the UL channel can be different from the actual quality of the UL channel. If the UE transmits UL data according to the MCS determined based on an incorrect channel quality, a data transmission time can increase or unnecessary repeated transmission can occur, causing the power consumption of the UE. If the UE transmits a CC value for each of a plurality of frequency bands to the eNB, the power consumption of the UE increases.

In the present disclosure, the channel quality of the UL is measured using the RA signal as well as the CC. The RA signal is a signal transmitted from the UE to the eNB for UL data transmission. Thus, if successfully receiving the RA signal, the eNB measures the channel quality of the UL. When the RA signal is used, the UL channel quality can be correctly measured.

However, due to the characteristics of an RA process, the RA signal signals can be transmitted by multiple UEs through an identical channel, causing collision. Thus, the channel quality measured using the colliding RA signals may not be better than an actual channel quality. In the current CIoT system, various schemes have been provided to reduce a probability that the RA signals of the multiple UEs collide with each other. The colliding probability of the RA signals is very low as several % or less.

If random accesses by the plurality of UEs collide with each other, channel quality values based on the RA signals can be different from an actual channel quality value. However, if the collision occurs, an RA process of every UE attempting the random access has a high probability of failing. As such, if every UE fails in the random access, a channel measurement value based on the RA signal is not used.

If a random access of a UE succeeds in spite of the occurrence of collision, a channel quality value based on a RA signal can seem to have a value that is similar to a channel quality value for the UE. Thus, there is no big issue in the use of a channel measurement value based on the RA signal for the UE.

Embodiments of the present disclosure will be described in detail below with reference to the accompanying drawings.

There are three CIoT system schemes based on a frequency band to be used in a CIoT system.

Figure 1:
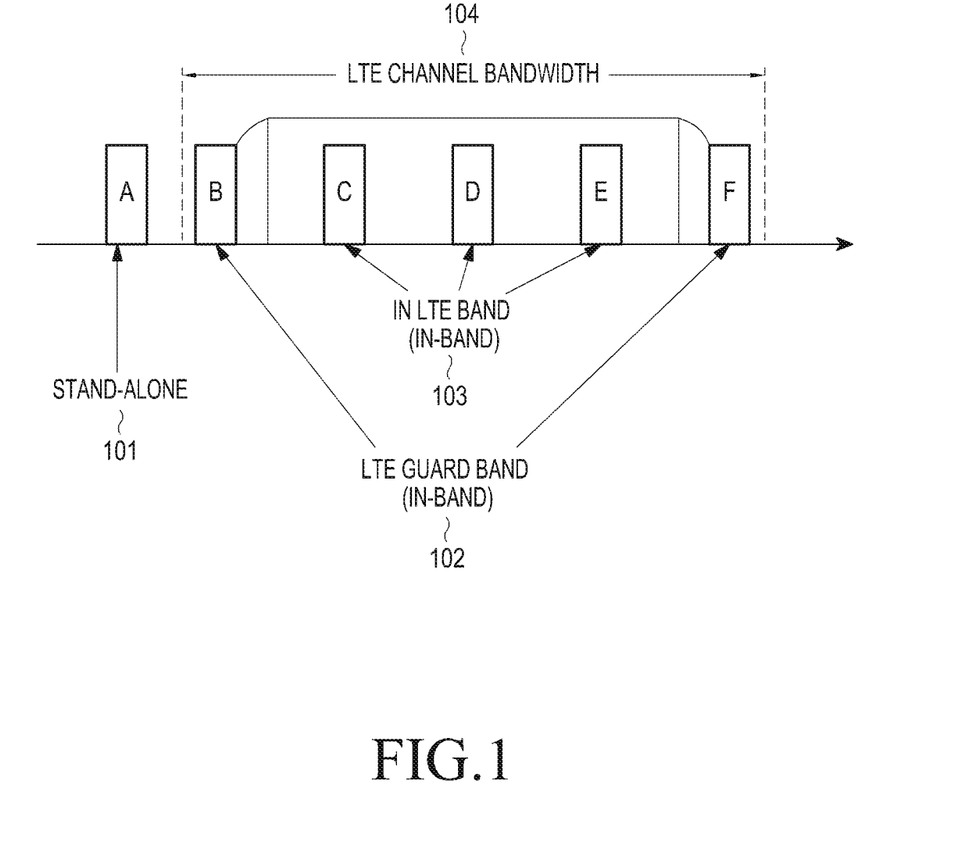
FIG. 1 illustrates three schemes for allocating a frequency band in a CIoT system.

FIG. 1 illustrates three schemes for allocating a frequency band in a CIoT system.

The first scheme is a stand-alone scheme 101 using a licensed band in which the CIoT system operates in a frequency band that is not used in an LTE system. In FIG. 1, a band "A" is used in place of an LTE channel bandwidth 104. Currently, the LTE system is used in various frequency bands. The size of a frequency band allocated to a common carrier to use the LTE system is not mostly identical to an LTE system bandwidth (1.4/3/5/10/20 MHz). Thus, there can be a frequency band that is not actually used in the frequency band allocated to the common carrier, and the CIoT system can operate in that non-used frequency band. In particular, it is very easy to secure a narrow band for operating the CIoT system.

The second scheme is an LTE guard band scheme 102 in which the CIoT system operates in a guard band in the LTE system band. In FIG. 1, guard bands "B" and "F" in the LTE channel bandwidth 104 can be used.

The third scheme is an LTE in-band scheme in which at least one physical resource block (PRB) in the LTE channel band is allocated to the CIoT system. In FIG. 1, bands "C", "D", and "E" in the LTE channel bandwidth 104 can be used.

The CIoT system has no reference signal for UL channel quality measurement to reduce the implementation complexity and power consumption of the UE. Thus, resource allocation information determined by the eNB for resource allocation to the UE for UL data communication of the UE is determined based on downlink (DL) link channel quality.

The resource allocation information can include modulation and coding scheme (MCS) information of UL data and time/frequency resource element information to which the UL data is to be allocated. When the CIoT system operates an UL and a DL by using a frequency division duplex (FDD) scheme, there can be a large channel quality difference between the DL and the UL. For example, in a typical urban (TU)-1 Hz channel model, a channel quality difference between a DL and an UL is about 15 dB. If the channel quality of the DL is worse than that of the UL, when an MCS for UL transmission is allocated to the UE, a lower MCS than an MCS that is to be allocated for a channel of the UL is allocated assuming a channel having a lower channel quality than that of the UL. In this case, excessive repeated transmission occurs due to the low MCS, increasing the power consumption of the UE. On the other hand, if the channel quality of the DL is better than that of the UL, a higher MCS than an MCS that is to be allocated is allocated assuming a higher channel quality than that of the UL. In this case, the UE performs excessive re-transmission due to a failure in data transmission. This also increases the power consumption of the UE.

Meanwhile, a common carrier can use one or more frequency bands including the aforementioned three frequency use schemes to support multiple CIoT UEs. That is, the CIoT system can use a plurality of frequency bands. As such, when a frequency band having an optimal channel quality between an eNB and a UE is used in a multi-band CIoT system using a plurality of frequency bands, the power consumption of the CIoT UE can be largely reduced, increasing the expected life span of the UE.

Moreover, due to the characteristics of the CIoT system, multiple UEs mostly do not move at particular positions, such that most UEs experience very static channel characteristics. In addition, the width of a frequency band used by a UE is narrow. As such, UEs in the CIoT system have a static channel environment and use a narrow-band channel, making it difficult to secure time or frequency diversity in a frequency band. As a result, a UE experiencing serious fading requires power consumption to overcome fading. If serious fading occurs in a frequency band used by a UE when the CIoT system uses a plurality of bands, a band having a good channel quality other than a currently used band is used, preventing power consumption caused by fading. Meanwhile, as a CIoT UE having mobility moves away from an eNB, the CIoT UE requires a higher transmission power for communication with the eNB, increasing power consumption. Such a UE suppresses an increase in transmission power by using a lower frequency band as the UE moves away from the eNB.

To search for a band having optimal quality between the eNB and the UE in a typical cellular communication system, a reference signal is generally used. That is, a transmission side transmits a reference signal for each frequency band, and a reception side measures the reception quality of the reference signal to measure the channel quality of the band.

Assuming that channel measurement using the reference signal is applied to the CIoT system, the UE transmits the reference signal to the eNB in every band before transmitting every UL data, and the eNB receives the reference signal sent from the UE to measure an UL channel quality for each band, selects a band having an optimal channel quality and informs the UE of the selected band, such that the eNB and the UE can communicate in the selected band. However, in this case, the UE has to transmit a reference signal through every band for every UL data transmission, causing high power consumption. Due to the characteristics of the CIoT UE that needs to guarantee the long life span using a limited battery, a scheme that measures a channel quality by using the reference signal is not suitable in terms of the power consumption of the CIoT UE.

Figure 2:
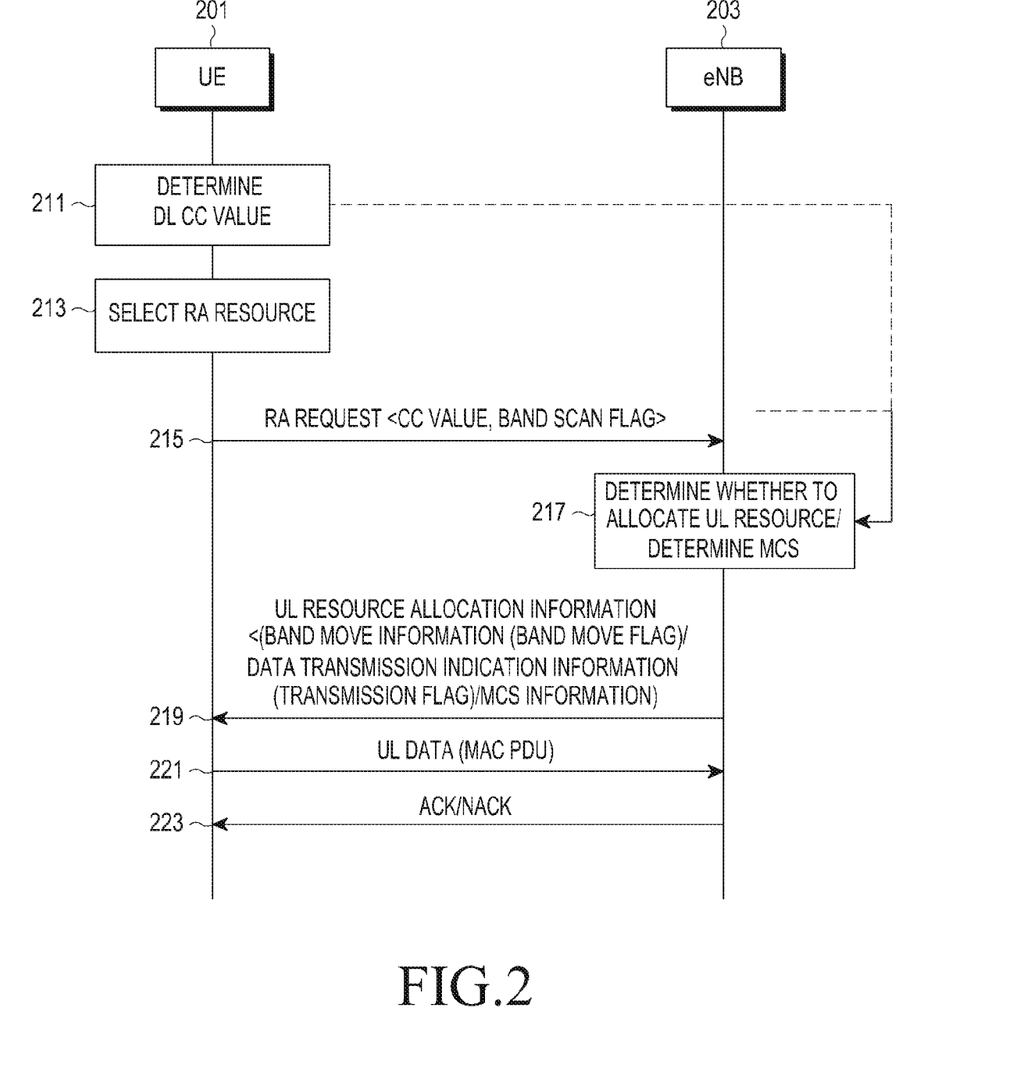
FIG. 2 is a diagram for describing an operation of measuring an UL channel of a CIoT UE according to an embodiment of the present disclosure.

FIG. 2 is a diagram for describing an operation of measuring an UL channel of a CIoT UE according to an embodiment of the present disclosure.

In operation 211, a UE 201 determines a CC value based on a DL signal received from an eNB 203. A process in which the UE 201 receives a DL signal is not illustrated. Meanwhile, the DL signal is used to determine the CC value and a type thereof is not limited.

The UE 201 selects an RA channel for a random access in operation 213, and sends an RA request through the selected channel in operation 215. In FIG. 2, it is assumed that the CC value is transmitted through the RA signal. However, as discussed above, the CC value is not necessarily transmitted through the RA signal as long as the eNB 203 can obtain the CC value for the UE 201 through an arbitrary means. For example, when the CIoT UE 201 having no mobility is registered in a common carrier, a distance between the CIoT UE 201 and the eNB 203 can be determined and the CC value for the CIoT UE 20 can be determined according to the distance. In this case, the CC value for the UE 201 can be known in advance to the eNB 203.

Meanwhile, in an embodiment of the present disclosure, a multi-band CIoT system is assumed. Thus, the UE 201 can transmit information indicating whether an RA process is performed for a plurality of bands to the eNB 203 through the RA signal. In the present disclosure, this information will be referred to as "band scan information". The band scan information can be one-bit information in a flag format, which indicates whether an RA process is performed for all of the plurality of bands allocated to the CIoT system, or can be information in a bitmap format, which has a plurality of bits indicating whether the RA process is performed for each band. In another way, the band scan information can be information indicating the number of bands in which the random access procedure is attempted or completed or is not attempted or not completed. Meanwhile, the UE 201 or the eNB 203 updates, at predetermined intervals, information regarding whether an RA process is performed for all bands, and the predetermined interval can be determined in advance or can be determined according to received interval information through upper layer signaling from the eNB 203. In operation 217, the eNB 203 measures a channel quality of a band in which a signal is transmitted, by using the received CC value and the RA signal. That is, the eNB 203 measures the channel quality using the CC value and measures the channel quality using the RA signal. Thereafter, the eNB 203 determines whether to allocate a resource of a band to the UE 201 based on a weighted sum of the channel quality using the CC value and the channel quality using the RA signal, and determines an MCS value once resource allocation is determined.

More specifically, the eNB 203 determines the weight value determined based on a difference between the channel quality using the CC value and the channel quality using the RA signal and a predetermined threshold value, and determines whether to allocate a resource and/or an MCS by using the weighted sum of the channel quality using the CC value and the channel quality using the RA signal.

In operation 219, the eNB 203 transmits resource allocation information to the UE 201 according to the determination made in operation 217. In the present disclosure, the eNB 203 can transmit, to the UE 201, "band move information" instructing the UE 201 to perform an RA process again after moving to another band that is not a band in which the RA signal is currently transmitted, and "data transmission indication information" indicating whether the UE 201 is to transmit data through a band.

The band move information and the data transmission indication information can be one-bit information in the flag format. The band move information indicates that the UE 201 has to perform an RA process while moving between bands until a good-quality band is discovered, because the quality of the band in which the RA signal is currently transmitted is not good. The band move information can include information about a band in which the UE 201 is to attempt the next RA process. According to circumstances, the band in which the UE 201 is to attempt the next RA process can be determined by a preset scheme. For example, the UE 201 having received the band move information can be preset to attempt the RA process by moving one band or a plurality of bands to the right or to the left from the current band. If a band is allocated to the UE 201 for data transmission, UL resource allocation information can include the MCS information determined in operation 217.

Once an RA resource is allocated and data transmission is indicated using the data transmission indication information in operation 219, the UE 201 transmits UL data based on the MCS through the allocated resource in operation 221. Meanwhile, not shown, once band movement is instructed by the band move information, the UE 201 attempts a random access through another band.

In operation 223, the eNB 203 transmits a response signal (acknowledgement (ACK)/negative acknowledgement (NACK)) with respect to the received UL data.

In FIG. 2, the following modified embodiment in relation to band scan information is also possible.

Although it is described in FIG. 2 that the band scan information is included in the RA signal in operation 215, the band scan information may not be transmitted through the RA signal. In this case, the eNB 203 may not know whether the UE 201 attempts a random access for all bands, and the eNB 203 transmits the band move information to the UE 201 irrespectively of reception of the band scan information in operation 219. The UE 201 having received the band move information can ignore the band move information if having scanned all the bands, and can re-attempt a random access after moving to another band according to the band move information if not having scanned all the bands. The band scan information can be transmitted to the eNB 203 through another signal or message (such as msg3 or an UL packet data unit (PDU)) transmitted to the eNB 203 after transmission of the RA signal. Thus, the UE 201 includes the band scan information in the UL data in operation 221.

Figure 3A:
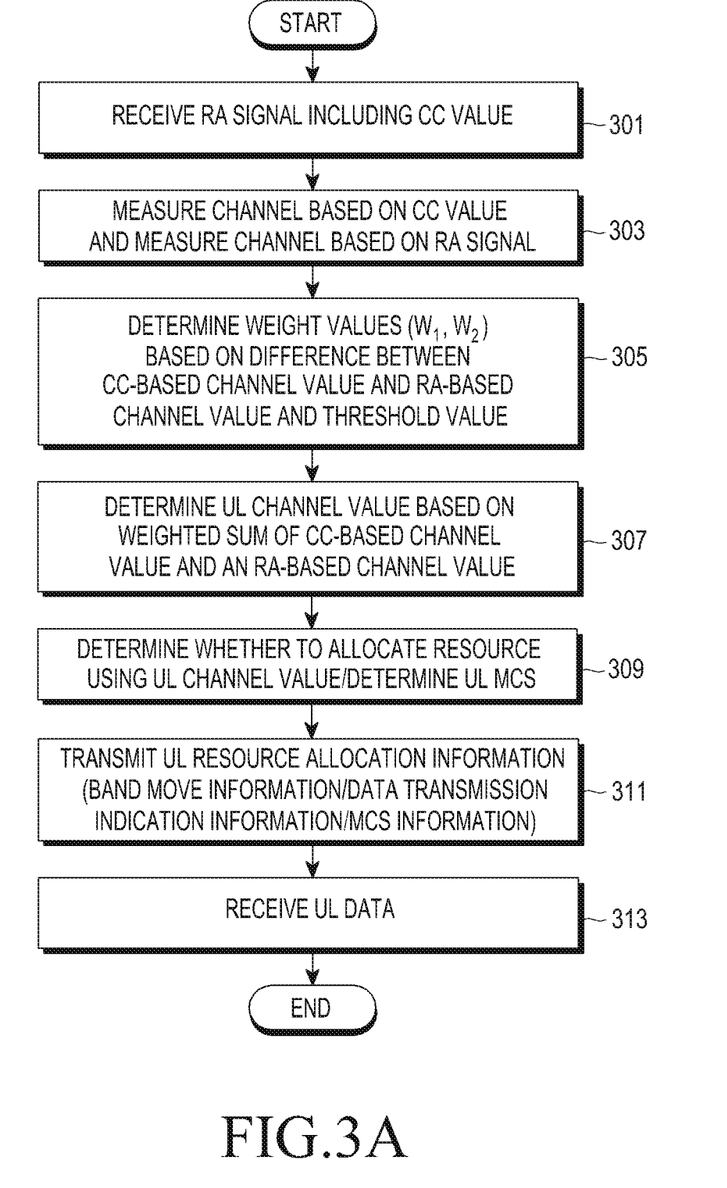
FIG. 3A is a flowchart of an operation of an eNB according to an embodiment of the present disclosure.

As to the modified embodiment of FIG. 2, the UE 201 transmits a RA signal not including the band scan information to the eNB 203 in operation 215, the eNB 203 transmits the "band move information" to the UE 201 in operation 219, and the UE 201 transmits UL data including the "band scan information" in operation 221, and the eNB 203 can know from the band scan information received in operation 221 whether the UE 201 moves to another band. FIG. 3A is a flowchart of an operation of an eNB according to an embodiment of the present disclosure.

In operation 301, the eNB 203 receives an RA signal including a CC value. In operation 303, the eNB 203 measures a quality of a channel based on the CC value and measures the quality of the channel based on the RA signal. In operation 305, the eNB 203 determines a weight value based on a difference between the channel quality based on the CC value and the channel quality based on the RA signal and a predetermined threshold value. In operation 307, the eNB 203 determines an UL channel quality value using a weighted sum of the channel quality based on the CC value and the channel quality based on the RA signal. Operations 305 and 307 will be described using an example.

An example of determining the weight value in operation 305 will be described with reference to FIG. 3B.

Figure 3B:
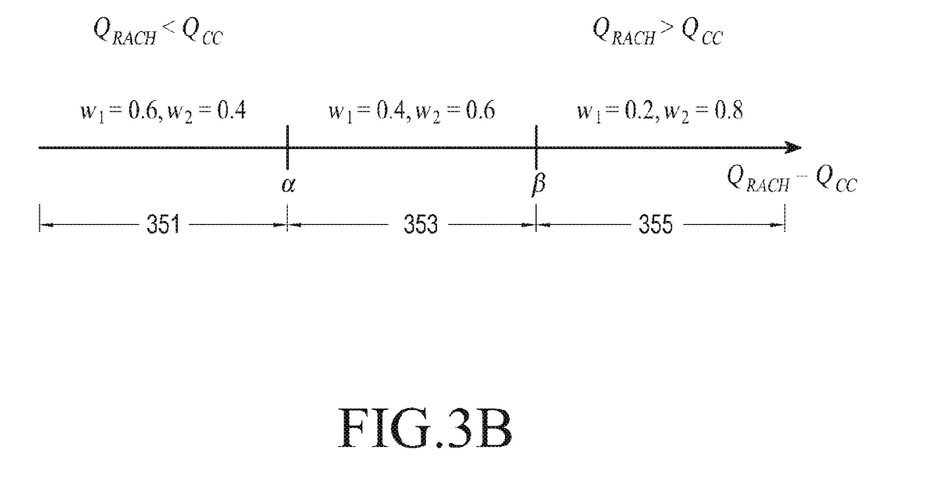
FIG. 3B is a diagram for describing the example of operation 305 of FIG. 3A.

FIG. 3B is a diagram for describing an example of operation 305 of FIG. 3A.

Let the measured channel quality based on the CC value be a "CC-based channel quality value ($Q_{CC}$)", and let the measured channel quality based on the RA signal be an "RA-based channel quality value ($Q_{RACH}$)". Threshold values $\alpha$ and $\beta$ ($\alpha<0<\beta$) are preset. In the present disclosure, a difference between the CC-based channel quality value ($Q_{CC}$) and the RA-based channel quality value ($Q_{RACH}$) is compared with the threshold values to determine a weight value $W_1$ for the CC-based channel quality value and a threshold value $W_2$ for the RA-based channel quality value.

In FIG. 3B, a horizontal axis indicates a value $Q_{RACH}-Q_{CC}$, and two threshold values $\alpha$ and $\beta$ ($\alpha<0<\beta$) are indicated. In FIG. 3B, the value $Q_{RACH}-Q_{CC}$ can be in three ranges depending on $\alpha$ and $\beta$. The three ranges can include a first range $Q_{RACH}-Q_{CC}<\alpha$ 351, a second range $\alpha<Q_{RACH}-Q_{CC}<\beta$ 353, and a third range $\beta<Q_{RACH}-Q_{CC}$ 355. In case of $Q_{RACH}-Q_{CC}<\alpha$, $W_1=0.6$ and $W_2=0.4$; in case of $\alpha<Q_{RACH}-Q_{CC}<\beta$, $W_1=0.4$ and $W_2=0.6$; and in case of $\beta<Q_{RACH}-Q_{CC}$, $W_1=0.2$ and $W_2=0.8$.

The channel quality using the weighted sum in operation 307 can be determined as below.

In operation 307, the weight values $W_1$ and $W_2$ determined in operation 305 can be multiplied to the CC-based channel quality value $Q_{CC}$ and the RA-based channel quality value $Q_{RACH}$, respectively, and a sum of the multiplication results can be determined as an UL channel quality value of a band. This is expressed as below.

$$Q=W_1 Q_{CC}+W_2 Q_{RACH} \qquad (1)$$

Referring back to FIG. 3A, the eNB 203 determines whether to allocate a resource of a band to the UE 201 by using the determined UL channel quality value in operation 309. If the eNB 203 determines to allocate the resource of the band to the UE 201, the eNB 203 determines an UL MCS for data transmission of the UE 201.

In operation 311, the eNB 203 transmits UL resource allocation information to the UE 201. The UL resource allocation information can include at least one of the "band move information", the "data transmission indication information", and the "MCS information". Thereafter, in operation 313, the eNB 203 receives the UL data through the resource allocated in the UL resource allocation information.

As described in the modified embodiment of FIG. 2, the eNB 203 can receive the band scan information from the UE 201 in operation 301 or operation 313.

Figure 4:
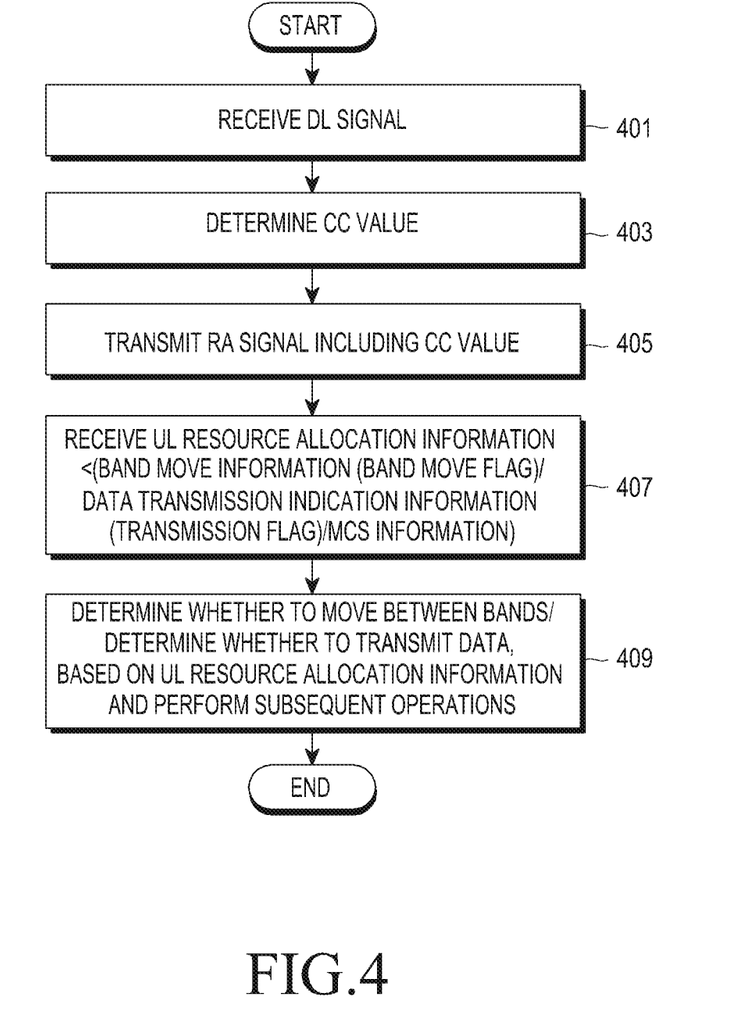
FIG. 4 is a flowchart of an operation of a UE according to an embodiment of the present disclosure.

FIG. 4 is a flowchart of an operation of a UE according to an embodiment of the present disclosure.

In operation 401, the UE 201 receives a DL signal from the eNB 203. The DL signal is used to determine the CC value and a type thereof is not limited. In operation 403, the UE 201 determines the CC value by using the DL signal. In operation 405, the UE 201 transmits an RA signal including the CC value to the eNB 203. The RA signal can include "band scan information" indicating whether an RA process is performed for a plurality of bands. In operation 407, the UE 201 receives UL resource allocation information from the eNB 203. The UL resource allocation information can include at least one of the band move information, the data transmission indication information, and the MCS information.

In operation 409, the UE 201 performs the following operation based on the UL resource allocation information. More specifically, if the band move information indicates band movement, the UE 201 moves to another band to perform again the operations following operation 401. If the data transmission indication information indicates data transmission through a channel, the UE 201 transmits UL data based on the MCS information. Meanwhile, as described in the modified example of FIG. 2, the band scan information is transmitted to the eNB 203 during the transmission of the UL data in operation 409 rather than in operation 405.

Hereinbelow, in FIGS. 5 through 7, various embodiments will be described based on the above-described embodiment of the present disclosure. An order of operations proposed in the present disclosure is not limited to the order of operations shown in left columns of FIGS. 5, 6, and 7.

Figure 5:
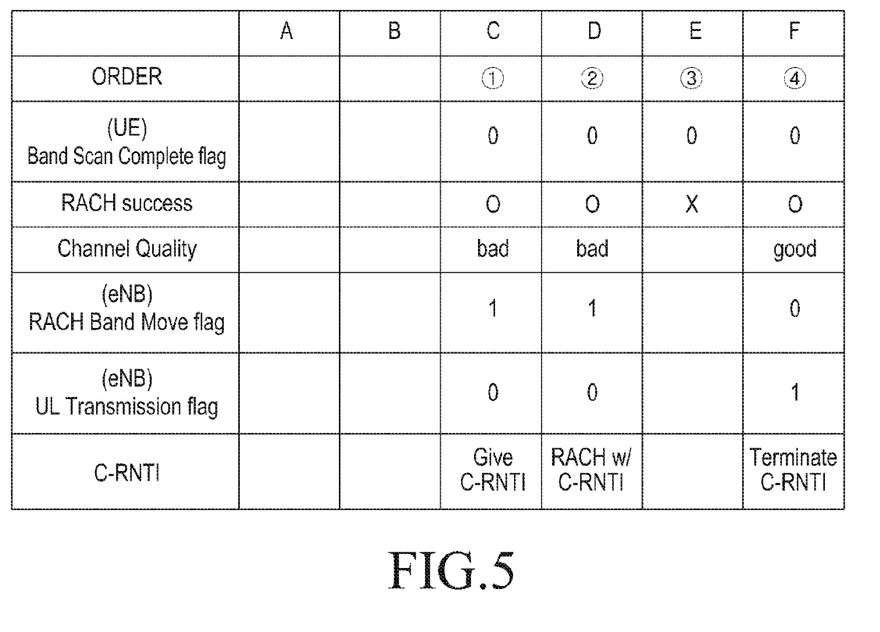
FIG. 5 is a diagram for describing an embodiment assuming that a UE needs transmission of UL data and a size of a random access (RA) signal is smaller than a size of UL data to be transmitted by the UE.

FIG. 5 is a diagram for describing an embodiment assuming that a UE needs transmission of UL data and a size of an RA signal is smaller than a size of UL data to be transmitted by the UE.

If a size of an RA signal is smaller than a size of UL data to be transmitted by the UE, a long time is needed for transmission of the UL data, such that it is necessary to transmit the UL data through a band having a good channel quality. As a result, in FIG. 5, the UE transmits an RA signal while moving between bands until a band having a good channel quality is discovered. If a channel quality of a band in which an RA signal is transmitted is lower than a predetermined criterion value, that is, in case of a bad channel quality, UL data transmission in the band is skipped and an RA process is attempted in another band. Once a band having a good channel quality higher than the predetermined criterion value is detected, the UE transmits the UL data in the band and does not move to another band for transmission of an RA signal. Meanwhile, the eNB can give a temporary identifier, e.g., a cell radio network temporary identifier (C-RNTI) to the UE in an initial RA process, to store a channel quality of the UE in the band by using the temporary identifier. In this way, the eNB performs an RA process with the UE until the band having the good channel quality is detected.

This will be described in detail with reference to FIG. 5.

A table shown in FIG. 5 assumes that the UE initially performs an RA process from a band C when six bands A, B, C, D, E, and F are allocated between the UE and the eNB.

The RA process for the band C is as described below.

Since the UE first attempts an RA process in the band C, the UE sets "band scan information (=Band Scan Complete flag)" to "0" to indicate that an RA process is not performed for all bands, and transmits an RA signal including the band scan information to the eNB. As described in the modified example of FIG. 2, the band scan information can be transmitted after the above operation. The RA signal can also include a CC value. The eNB is assumed to detect the RA signal. To indicate so, an item "RACH success" is indicated by "O" in the band C in FIG. 5. As stated above, if a quality of a channel measured by the eNB based on an RA signal or a CC value is not good (or is bad), the eNB sets "band move information (=Band Move flag)" to "1". The band move information set to 1 in FIG. 5 is assumed to indicate that the UE needs to move one band to the right from the current band to perform an RA process. Since the quality of the band C is bad, the eNB sets "data transmission indication information (=UL transmission flag)" to "0" to indicate that an UL signal is not to be transmitted through the band C. The eNB transmits the band move information and the data transmission indication information to the UE. The eNB gives a temporary identifier (=C-RNTI) to the UE, and stores the channel quality of the band C using the temporary identifier given to the UE.

The RA process for the band D is as described below.

Since the eNB sets the band move information (=Band Move flag) to "1" in the description of the band C, the UE performs a new RA process in the band D. A description of the RA process in the band D is identical to the description of the RA process in the band C. However, the RA process in the band D is a process performed second, such that the random access process is performed using an existing given C-RNTI rather than a newly given C-RNTI. This is indicated by "RACH with C-RNTI".

The RA process for the band E is as described below.

It is assumed that the RA signal transmitted by the UE is not detected by the eNB in the band E. Thus, the item "RACH success" is indicated by "X".

The RA process for the band F is as described below.

Only differences than the RA process in the band C will be described. It is assumed that the eNB receives an RA signal and a measured channel quality of the band F is determined to be good. Since the channel quality of the band F is good, the eNB sets "band move information (=Band Move flag)" to "0". The band move information set to 0 indicates that the UE does not need to perform an RA process by moving between bands any longer. Since the quality of the band F is good, the eNB sets "data transmission indication information (=UL transmission flag)" to "1" to indicate that an UL signal is to be transmitted through the band F.

Figure 6:
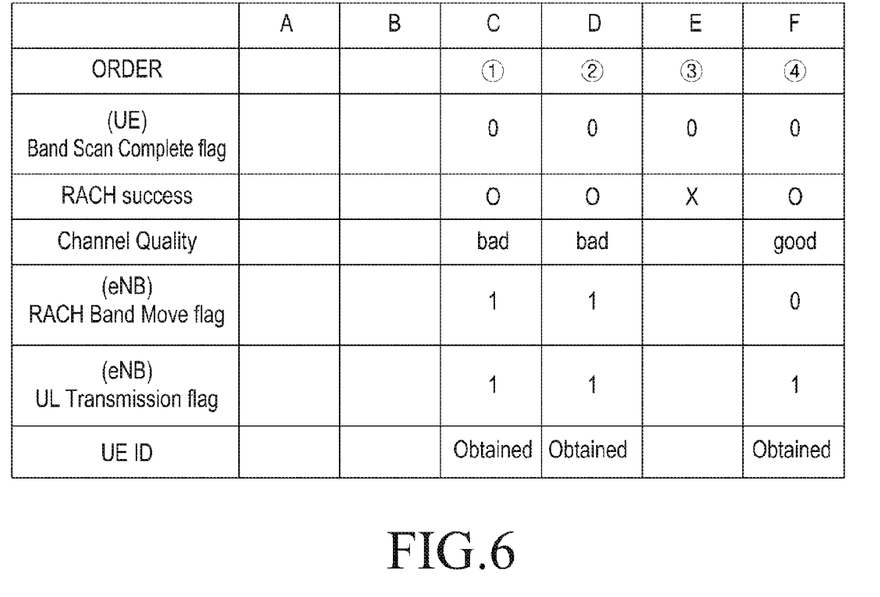
FIG. 6 is a diagram for describing an embodiment assuming that a UE needs transmission of UL data is needed and a size of an RA signal is not smaller than a size of UL data to be transmitted by the UE.

FIG. 6 is a diagram for describing an embodiment assuming that a UE needs transmission of UL data is needed and a size of an RA signal is not smaller than a size of UL data to be transmitted by the UE.

In this case, unlike described with reference to FIG. 5, the size of the RA signal is not smaller than the size of the UL data, and thus if an RA process is attempted several times until a band having a good channel quality is detected, instead of transmitting the UL data in a band having a bad channel quality, the power consumption of the UE can increase largely. Therefore, in FIG. 6, the UE transmits the UL data through a channel even if the quality of the channel is not good. However, it is similar to the case of FIG. 5 in a sense that the UE performs an RA process while moving between bands until the band having the good channel quality is detected. The eNB allocates a temporary identifier, C-RNTI, to the UE during an initial RA process in FIG. 5, whereas the eNB obtains a unique ID of the UE from the UE and stores a channel quality of the band by using the obtained unique ID of the UE in FIG. 6. In this way, the eNB performs an RA process with the UE until the band having the good channel quality is detected.

This will be described in detail with reference to FIG. 6.

The RA process for the band C is as described below.

The UE sets "band scan information (=Band Scan Complete flag)" to "0" to indicate that a first RA process is attempted in the band C, and transmits an RA signal including the band scan information to the eNB. The band scan information can be transmitted after the above operation. The RA signal can also include a CC value. The eNB is assumed to detect the RA signal. To indicate so, an item "RACH success" is indicated by "O" in the band C in FIG. 6.

If a quality of a channel measured by the eNB based on an RA signal or a CC value is not good (or is bad), the eNB sets "band move information (=Band Move flag)" to "1". The band move information set to 1 in FIG. 6 is assumed to indicate that the UE needs to move one band to the right from the current band to perform an RA process.

In FIG. 5, since the quality of the band C is bad, the eNB sets "data transmission indication information (=UL transmission flag)" to "0" to indicate that an UL signal is not to be transmitted through the band C. However, in FIG. 6, since the size of the UL data to be transmitted by the UE is not large, the UL data is transmitted through the band even if the channel quality of the band is bad. Thus, in FIG. 6, "data transmission indication information (=UL transmission flag)" is set to "1" in FIG. 6. The eNB transmits the band move information and the data transmission indication information, which are set as described above, to the UE. The eNB obtains a UE identifier (ID) included in an RA signal transmitted by the UE and stores a channel quality of the UE in the band C by using the UE ID.

The RA process for the band D is as described below.

Since the eNB sets the band move information (=Band Move flag) to "1" in the description of the band C, the UE performs a new RA process in the band D. A description of the RA process in the band D is identical to the description of the RA process in the band C.

The RA process for the band E is as described below.

It is assumed that the RA signal transmitted by the UE is not detected by the eNB in the band E. Thus, the item "RACH success" is indicated by "X".

The RA process for the band F is as described below.

Only differences than the RA process in the band C will be described. It is assumed that the eNB receives an RA signal and a measured channel quality of the band F is determined to be good. Since the channel quality of the band F is good, the eNB sets "band move information (=Band Move flag)" to "0". The band move information set to 0 indicates that the UE does not need to perform an RA process by moving between bands any longer. The eNB sets "data transmission indication information (=UL transmission flag)" to "1" to indicate that an UL signal is to be transmitted through the band F.

Figure 7:
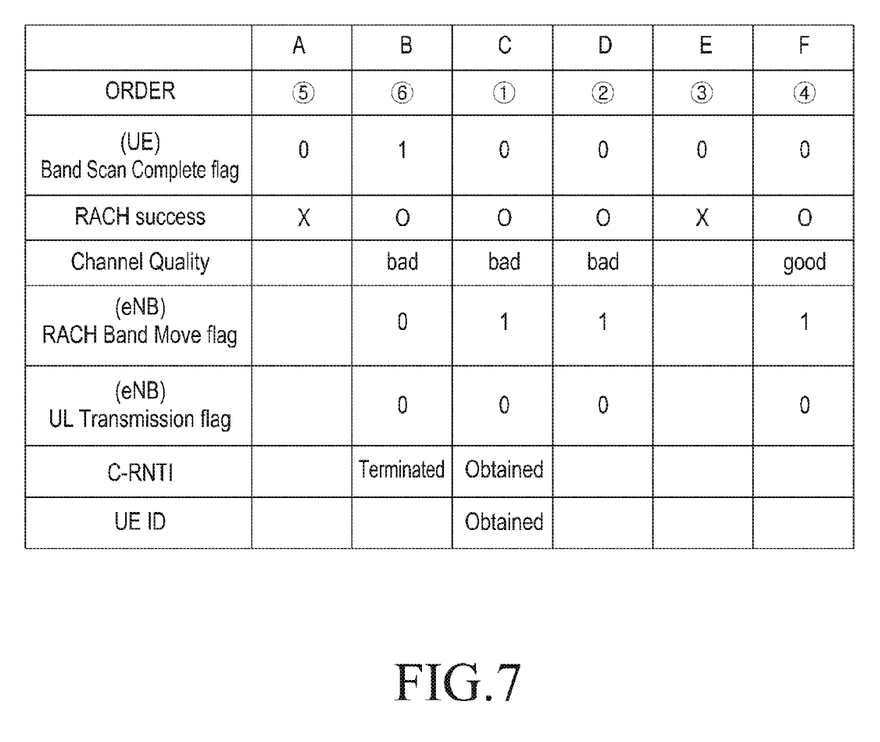
FIG. 7 is a diagram for describing an operation of measuring a band-specific channel quality in a situation where a UE has no need to transmit UL data according to an embodiment of the present disclosure.

FIG. 7 is a diagram for describing an operation of measuring a band-specific channel quality in a situation where a UE has no need to transmit UL data according to an embodiment of the present disclosure.

The embodiments described with reference to FIGS. 5 and 6 assume that there is UL data to be transmitted by the UE. On the other hand, in FIG. 7, a band-specific channel quality is measured when there is no UL data to be transmitted by the UE, such that "data transmission indication information (=UL transmission flag)" is set to "0", and "band move information (=Band Move flag)" is set to "1" until channel quality measurement is performed for all bands. The operation described with reference to FIG. 7 can be performed periodically at predetermined intervals or aperiodically at the request of the eNB. In this case, the UE does not need to transmit UL data, such that the eNB can transmit control information indicating an RA process for channel quality measurement for all bands to the UE. The eNB can use a temporary ID to match a channel quality measured for each band to the UE, or can obtain the UE ID by sending a request for the UE ID to the UE.

This will be described in detail with reference to FIG. 7.

It is assumed that the UE performs the RA process for the band C, and it is also assumed that band movement increases by one band to the right as shown in FIGS. 5 and 6.

The RA process for the band C is as described below.

The UE sets "band scan information (=Band Scan Complete flag)" to "0" to indicate that a first RA process is attempted in the band C, and transmits an RA signal including the band scan information to the eNB. As described in the modified example of FIG. 2, the band scan information can be transmitted after the above operation. The RA signal can include a CC value. The eNB detects an RA signal and thus an item "RACH success" is indicated by "O". As a result of measuring, by the eNB, the quality of a channel based on the RA signal or the CC value, the quality of the band C is determined to be bad.

The eNB sets the "band move information (=Band Move flag)" to "1". Since FIG. 7 corresponds to an embodiment for measuring a channel quality for all bands, the "band move information (=Band Move flag)" is set to "1" regardless of whether the quality of the band C is good or bad, until a random access is attempted for all bands. The UE does not need to transmit UL data, and thus the "data transmission indication information (=UL transmission flag)" is set to "0" regardless of the quality of the band C. The eNB transmits the band move information and the data transmission indication information, which are set as described above, to the UE. Meanwhile, the eNB assigns a temporary ID (=C-RNTI) to the UE or obtains the unique ID of the UE to store the channel quality measured for the band by using the temporary ID or the UE ID.

The RA process for the band D is as described below.

Since the eNB sets the band move information (=Band Move flag) to "1" in the description of the band C, the UE performs a new RA process in the band D. A description of the RA process in the band D is identical to the description of the RA process in the band C. However, the temporary ID has already been given and the UE ID has been obtained, such that an additional operation related to the ID is not necessarily performed.

The RA process for the band E is as described below.

It is assumed that the RA signal transmitted by the UE is not detected by the eNB in the band E. Thus, the item "RACH success" is indicated by "X".

The RA process for the band F is as described below.

Only differences than the RA process in the band C will be described. It is assumed that the eNB receives an RA signal and a measured channel quality of the band F is determined to be good. In spite of the good channel quality of the band, the eNB sets "band move information (=Band Move flag)" to "1". This is because FIG. 7 corresponds to an embodiment for measuring a channel quality for all bands.

The RA process for the band A is as described below.

Since the band move information (=Band Move flag)" is set to "1" in a process for the band F, the UE attempts an RA process in the band A next to the band F among all the bands. However, it is assumed that the RA signal transmitted by the UE is not detected by the eNB in the band A. Thus, the item "RACH success" is indicated by "X".

The RA process for the band B is as described below.

When the UE attempts a random access in the band B, the UE attempts a random access for all the bands, such that the UE sets "band scan information (=Band Scan Complete flag)" to "1" and transmits an RA signal including the band scan information to the eNB. As described in the modified example of FIG. 2, the band scan information can be transmitted after the above operation. The eNB detects an RA signal and thus an item "RACH success" is indicated by "O". As a result of measuring, by the eNB, the quality of a channel based on the RA signal or the CC value, the quality of the band C is determined to be bad. Since the RA process for all the bands has been performed, the eNB sets "band move information (=Band Move flag)" to "0". The eNB sets the "data transmission indication information (=UL transmission flag)" to "0" regardless of the quality of the band C. The eNB transmits the band move information and the data transmission indication information, which are set as described above, to the UE. The eNB does not need to receive an RA signal from the UE any longer, and thus terminates the temporary ID (=C-RNTI) assigned in the process for the band C.

Figure 8:
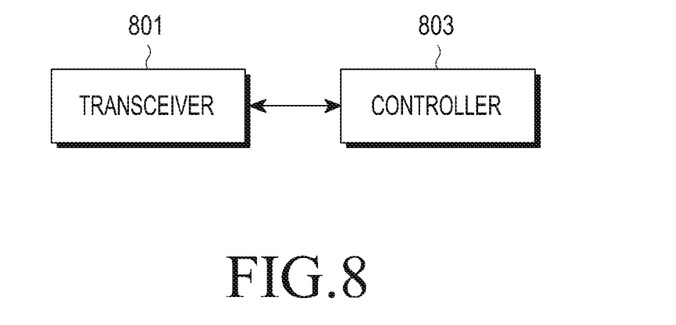
FIG. 8 is a block diagram of an eNB according to an embodiment of the present disclosure.

FIG. 8 is a block diagram of an eNB according to an embodiment of the present disclosure.

The eNB can include a transceiver 801 and a controller 803.

The transceiver 801 transmits and receives a signal to and from the UE. That is, the eNB receives an RA signal including a CC value, transmits UL resource allocation information to the UE, receives UL data from the UE, and transmits a response signal with respect to the received UL data.

The controller 803 performs overall operations of the eNB according to the above-described embodiments of the present disclosure. That is, the controller 803 measures a channel for a band by using an RA signal including a CC value received from the UE, and determines whether to allocate the band to the UE and/or determines an MCS. The controller 803 also sets "band move information" and "data transmission indication information" to a particular value and includes the set particular value in UL resource allocation information. In addition, the controller 803 controls the above-described operations of the eNB.

Figure 9:
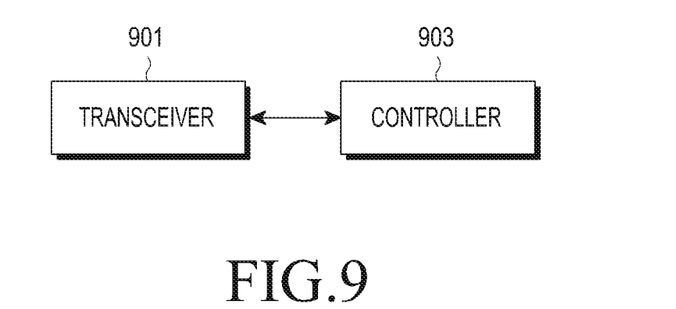
FIG. 9 is a block diagram of a UE according to an embodiment of the present disclosure.

FIG. 9 is a block diagram of a UE according to an embodiment of the present disclosure.

The UE can include a transceiver 901 and a controller 903.

The transceiver 901 transmits and receives a signal to and from the eNB. That is, the UE transmits an RA signal including a CC value to the eNB, receives UL resource allocation information from the eNB, transmits UL data from the eNB, and receives a response signal with respect to the transmitted UL data.

The controller 903 performs overall operations of the UE according to the above-described embodiments of the present disclosure. That is, the UE determines the CC value by using a DL signal received from the eNB and generates band scan information. The UE also generates an RA signal including the CC value and the band scan information and transmits the RA signal to the eNB through the transceiver 901. As described in the modified example of FIG. 2, the band scan information can be transmitted after the above operation. Thereafter, the UE performs the following operations according to information included in the UL resource allocation information received from the eNB. More specifically, if the band move information indicates band movement, the UE moves to another band to perform again an RA process. If the data transmission indication information indicates data transmission through a channel, the UE transmits UL data to the eNB based on MCS information.

Particular aspects of the present disclosure can be implemented with a computer-readable code on a computer-readable recording medium. The computer readable recording medium can be any type of data storage device that can store data readable by a computer system. Examples of record-mediums readable by the computer can include a read-only memory (ROM), a random-access memory (RAM), compact disk ROM (CD-ROM), magnetic tapes, floppy disks, optical data storage devices, carrier waves (such as data transmission through the Internet). The computer readable recording medium can be distributed through computer systems connected over a network, and thus the computer readable code is stored and executed in a decentralized manner. Further, functional programs, codes and code segments for achieving the present disclosure can be easily interpreted by programmers skilled in the art which the present disclosure pertains to.

The apparatus and method according to an embodiment of the present disclosure can be implemented by hardware, software, or a combination of hardware and software. Such arbitrary software can be stored, for example, in a volatile or non-volatile storage device (e.g., a ROM, etc.), a memory (e.g., a RAM, a memory chip, a memory device, or a memory integrated circuit (IC)), or a machine (e.g., computer) recordable optical or magnetic storage medium (e.g., a CD, a digital versatile disc (DVD), a magnetic disc, a magnetic tape, etc.) regardless of its ability to erase or rewrite. It can be seen that the method according to the present disclosure can be implemented by a computer or a portable UE which includes a controller and a memory, and the memory is an example of a machine-readable storage medium which is suitable for storing a program or programs including instructions for implementing the embodiment of the present disclosure.

Therefore, the present disclosure includes a program including codes for implementing an apparatus or method claimed in an arbitrary claim and a machine (computer)-readable storage medium for storing such a program. The program may be electronically transferred through an arbitrary medium such as a communication signal delivered through a wired or wireless connection, and the present disclosure properly includes equivalents thereof.

The apparatus according to an embodiment of the present disclosure may receive and store the program from a program providing device connected in a wired or wireless manner. The program providing device may include a memory for storing a program including instructions for instructing the apparatus to execute a preset method, information necessary for the method, a communication unit for performing wired or wireless communication with the apparatus, and a controller for transmitting a corresponding program to the apparatus at the request of the apparatus or automatically.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining an uplink (UL) link channel quality by a base station (BS) in a wireless communication system, the method comprising:
   obtaining a coverage class (CC) value of a user equipment (UE);
   receiving a random access (RA) signal from the UE;
   determining an UL channel quality of a band in which the RA signal is transmitted, based on the CC value and the RA signal; and
   generating UL resource allocation information based on the determined UL channel quality and transmitting the generated UL resource allocation information to the UE.

2. The method of claim 1, wherein the determining of the UL channel quality comprises:

measuring a CC-based channel quality based on the CC value;

measuring an RA-based channel quality based on the RA signal;

determining a CC weight value for the CC-based channel quality and an RA weight value for the RA-based channel quality based on a difference value between the CC-based channel quality and the RA-based channel quality and on a predetermined threshold value; and determining the UL channel quality based on a weighted sum of the CC-based channel quality to which the CC weight value is applied and the RA-based channel quality to which the RA weight value is applied.

3. The method of claim 1, wherein the CC value is included in the RA signal.

4. The method of claim 1, wherein band scan information indicating whether an RA process is attempted for all of a plurality of frequency bands allocated between the UE and the BS is included in the RA signal, or in UL data transmitted by the UE based on the UL resource allocation information.

5. The method of claim 4, wherein the band scan information is one-bit flag information, or bitmap information comprising a plurality of bits.

6. The method of claim 1, wherein the UL resource allocation information comprises at least one of band move information indicating that an RA process has to be performed again by moving to another band that is not the band in which the RA signal is transmitted, data transmission indication information indicating whether the UE transmits UL data through the band in which the RA signal is transmitted, and modulation and coding scheme (MCS) information for transmission of the UL data.

7. The method of claim 1, wherein the method is repeated while moving between a plurality of bands supported by the wireless communication system until the determined UL channel quality is greater than or equal to a predetermined criterion, if the UE needs transmission of UL data.

8. The method of claim 7, wherein if a size of the RA signal is smaller than a size of the UL data to be transmitted by the UE, the UE does not transmit the UL data in a band in which the UL channel quality is less than the predetermined criterion.

9. The method of claim 7, wherein if a size of the RA signal is not smaller than a size of the UL data to be transmitted by the UE, the UE transmits the UL data in a band in which the UL channel quality is less than the predetermined criterion.

10. The method of claim 1, wherein the method is repeated while moving between a plurality of bands supported by the wireless communication system, if the UE does not need transmission of UL data.

11. A method for performing a random access by a user equipment (UE) in a wireless communication system, the method comprising:

determining a coverage class (CC) value of the UE based on a downlink (DL) signal;

transmitting a random access (RA) signal comprising the CC value to a base station; and receiving uplink (UL) resource allocation information from the BS, wherein the UL resource allocation information is generated based on a channel quality of a band in which the RA signal is transmitted, wherein the channel quality of the band is determined by the BS based on the CC value and the RA signal.

12. The method of claim 11, wherein band scan information indicating whether an RA process is attempted for all of a plurality of frequency bands allocated between the UE and the BS is included in the RA signal, or in UL data transmitted by the UE based on the UL resource allocation information.

13. The method of claim 12, wherein the band scan information is one-bit flag information, or bitmap information comprising a plurality of bits.

14. The method of claim 11, wherein the UL resource allocation information comprises at least one of band move information indicating that an RA process has to be performed again by moving to another band that is not the band in which the RA signal is transmitted, data transmission indication information indicating whether the UE transmits UL data through the band in which the RA signal is transmitted, or modulation and coding scheme (MCS) information for transmission of the UL data.

15. The method of claim 11, wherein the method is repeated while moving between a plurality of bands supported by the wireless communication system until the determined UL channel quality is greater than or equal to a predetermined criterion, if the UE needs transmission of UL data.

16. The method of claim 15, wherein if a size of the RA signal is smaller than a size of the UL data to be transmitted by the UE, the UE does not transmit the UL data in a band in which the UL channel quality is less than the predetermined criterion.

17. The method of claim 15, wherein if a size of the RA signal is not smaller than a size of the UL data to be transmitted by the UE, the UE transmits the UL data in a band in which the UL channel quality is less than the predetermined criterion.

18. The method of claim 11, wherein the method is repeated while moving between a plurality of bands supported by the wireless communication system, if the UE does not need transmission of UL data.

19. A base station (BS) for determining a channel quality in a wireless communication system, the BS comprising:

a transceiver configured to obtain a coverage class (CC) value of a user equipment (UE) and to receive a random access (RA) signal from the UE; and a controller configured to:
  determine an UL channel quality of a band in which the RA signal is transmitted, based on the CC value and the RA signal,
  generate UL resource allocation information based on the determined UL channel quality, and
  transmit the generated UL resource allocation information to the UE through the transceiver.

20. The BS of claim 19, wherein the controller is further configured to:

when determining the UL channel quality:
  measure a CC-based channel quality based on the CC value;
  measure an RA-based channel quality based on the RA signal;
  determine a CC weight value for the CC-based channel quality and an RA weight value for the RA-based channel quality based on a difference value between the CC-based channel quality and the RA-based channel quality and on a predetermined threshold value; and
  determine the UL channel quality based on a weighted sum of the CC-based channel quality to which the CC weight value is applied and the RA-based channel quality to which the RA weight value is applied.

21. The BS of claim 19, wherein the CC value is included in the RA signal.

22. The BS of claim 19, wherein band scan information indicating whether an RA process is attempted for all of a plurality of frequency bands allocated between the UE and the BS is included in the RA signal, or in UL data transmitted by the UE based on the UL resource allocation information.

23. The BS of claim 22, wherein the band scan information is one-bit flag information, or bitmap information comprising a plurality of bits.

24. The BS of claim 19, wherein the UL resource allocation information comprises at least one of band move information indicating that an RA process has to be performed again by moving to another band that is not the band in which the RA signal is transmitted, data transmission indication information indicating whether the UE transmits UL data through the band in which the RA signal is transmitted, or modulation and coding scheme (MCS) information for transmission of the UL data.

25. The BS of claim 19, wherein the BS is configured to switch between a plurality of bands supported by the wireless communication system until the determined UL channel quality is greater than or equal to a predetermined criterion, if the UE needs transmission of UL data.

26. The BS of claim 25, wherein if a size of the RA signal is smaller than a size of the UL data to be transmitted by the UE, the UE is configured not to transmit the UL data in a band in which the UL channel quality is less than the predetermined criterion.

27. The BS of claim 25, wherein if a size of the RA signal is not smaller than a size of the UL data to be transmitted by the UE, the UE is configured to transmit the UL data in a band in which the UL channel quality is less than the predetermined criterion.

28. The BS of claim 19, wherein the BS is configured to switch between a plurality of bands supported by the wireless communication system, if the UE does not need transmission of UL data.

29. A user equipment (UE) for performing random access in a wireless communication system, the UE comprising:
a controller configured to determine a coverage class (CC) value of the UE based on a downlink (DL) signal; and
a transceiver configured to:
transmit a random access (RA) signal comprising the CC value from a base station (BS); and
receive uplink (UL) resource allocation information from the BS,
wherein the UL resource allocation information is generated based on a channel quality of a band in which the RA signal is transmitted, wherein the channel quality of the band is determined by the BS based on the CC value and the RA signal.

30. The UE of claim 29, wherein band scan information indicating whether an RA process is attempted for all of a plurality of frequency bands allocated between the UE and the BS is included in the RA signal, or in UL data transmitted by the UE based on the UL resource allocation information.

31. The UE of claim 30, wherein the band scan information is one-bit flag information, or bitmap information comprising a plurality of bits.

32. The UE of claim 29, wherein the UL resource allocation information comprises at least one of band move information indicating that an RA process has to be performed again by moving to another band that is not the band in which the RA signal is transmitted, data transmission indication information indicating whether the UE transmits UL data through the band in which the RA signal is transmitted, or modulation and coding scheme (MCS) information for transmission of the UL data.

33. The UE of claim 29, wherein the UE is configured to switch between a plurality of bands supported by the wireless communication system until the determined UL channel quality is greater than or equal to a predetermined criterion, if the UE needs transmission of UL data.

34. The UE of claim 33, wherein if a size of the RA signal is smaller than a size of the UL data to be transmitted by the UE, the UE is configured not to transmit the UL data in a band in which the UL channel quality is less than the predetermined criterion.

35. The UE of claim 33, wherein if a size of the RA signal is not smaller than a size of the UL data to be transmitted by the UE, the UE is configured to transmit the UL data in a band in which the UL channel quality is less than the predetermined criterion.

36. The UE of claim 29, wherein the UE is configured switch between a plurality of bands supported by the wireless communication system if the UE does not need transmission of UL data.

* * * * *